United States Patent [19]

Vrouenraets et al.

[11] Patent Number: 4,493,870

[45] Date of Patent: Jan. 15, 1985

[54] FLEXIBLE LAYERED PRODUCT

[75] Inventors: Cornelius M. F. Vrouenraets, Dieren; Doetze J. Sikkema, Ellecom, both of Netherlands

[73] Assignee: Akzo nv, Arnhem, Netherlands

[21] Appl. No.: 556,999

[22] Filed: Dec. 1, 1983

[30] Foreign Application Priority Data

Dec. 2, 1982 [NL] Netherlands ............... 8204675

[51] Int. Cl.$^3$ ............................................. B32B 7/00
[52] U.S. Cl. .................................... 428/245; 428/246; 428/252; 428/419; 428/475.2; 428/913
[58] Field of Search ............... 428/262, 265, 267, 419, 428/913, 919, 475.2, 245, 246, 252; 528/301

[56] References Cited

U.S. PATENT DOCUMENTS

| | | | |
|---|---|---|---|
| 3,023,192 | 2/1962 | Shivers, Jr. | 260/75 |
| 3,891,604 | 6/1975 | Wolfe | 528/301 |
| 4,013,624 | 3/1977 | Hoeschele | 528/301 |
| 4,367,327 | 1/1983 | Holker et al. | 528/61 |

FOREIGN PATENT DOCUMENTS

| | | |
|---|---|---|
| 7604342 | 4/1976 | Netherlands . |
| 1404340 | 8/1975 | United Kingdom . |
| 1403210 | 8/1975 | United Kingdom . |
| 1545468 | 5/1979 | United Kingdom . |

OTHER PUBLICATIONS

Chemical Abstracts, vol. 80, No. 16, 1974, p. 72, No. 97294m, Columbus, Ohio, USA & JP-A-73 16146 (Toyobo Co.).

*Primary Examiner*—James J. Bell
*Attorney, Agent, or Firm*—Stevens, Davis, Miller & Mosher

[57] ABSTRACT

Flexible layered product for use in waterproof garments or tents of a textile material covered with a waterproof material having a water vapor transmission rate of at least 1000 g/m$^2$ day, the textile material being covered with a film of a copolyether ester consisting of a plurality of recurrent intralinear long-chain ester units and short-chain ester units which are randomly joined head-to-tail through ester bonds.

9 Claims, No Drawings

FLEXIBLE LAYERED PRODUCT

The invention relates to a flexible layered product suitable for the manufacture therefrom of waterproof garments or tents of a textile material covered with a waterproof material having a water vapour transmission rate of at least 1000 g/m² day.

Flexible layered products of the type indicated above are disclosed in British Patent Application No. 2,024,100.

The products described in it, which are to be used for the manufacture therefrom of, for instance, rainwear, are formed of a textile material which is successively covered with a microporous layer of, for instance, expanded porous PTFE and a hydrophilic layer of, for instance, a polyetherpolyurethane which permits the transfer through it of water vapour but prevents the passage of surface tension lowering agents such as those contained in perspiration, etc.

For use in garments and the like the textile material may optionally still be rendered hydrophobic.

Although these known products constitute a remarkable advance in the development of waterproof, breathable rainwear, they still display several disadvantages. The price of the porous material is relatively high, particularly if use is made of porous PTFE film. Moreover, the layers of the hydrophilic materials are relatively thick, which generally has a detrimental effect on the suppleness of the product.

Special preference, however, is given to the use of porous PTFE film both because of the strongly hydrophobic character of PTFE and the possibility of making a porous structure having pores measuring less than about 0.2 μm in diameter. This film has the special advantage that although its porosity permits the passage of water vapour, it is waterproof under a hydrostatic head of 25 cm water, which is determined with a modified Sutter's test apparatus, as described in the afore-mentioned British Patent Specification No. 2,024,100.

In all the examples of said patent specification these porous films are covered with relatively thick layers of highly hydrophilic materials, which may lead to a high degree of water absorption and, hence, strong swelling.

Use of very much thinner layers of these materials, for instance in the order of 10 to 20 μm, may readily lead to mechanical damage in the wet state.

The present invention provides flexible layered products which do not display the afore-mentioned disadvantages or only to a far smaller extent.

The invention consists in that with the flexible layered products of the type mentioned in the opening paragraph the textile material is covered with a film of a copolyether ester consisting of a plurality of recurrent intralinear long-chain ester units and short-chain ester units which are randomly joined head-to-tail through ester bonds, said long-chain ester units corresponding to the formula:

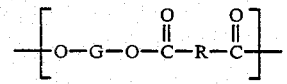

and said short-chain ester units corresponding to the formula:

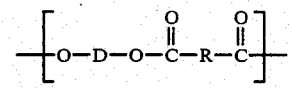

where G is a divalent radical remaining after removal of terminal hydroxyl groups from at least one long-chain glycol having a molecular weight in the range of 800 to 6000 and an atomic ratio of carbon to oxygen in the range of 2.0 to 4.3, at least 70% by weight of the long-chain glycol having a carbon to oxygen ratio in the range of 2.0 to 2.4, R is a divalent radical remaining after removal of carboxyl groups from at least one carboxylic acid having a molecular weight less than 300, and D is a divalent radical remaining after removal of hydroxyl groups from at least one diol having a molecular weight less than 250, at least 80 mole % of the dicarboxylic acid used consisting of terephthalic acid or the ester forming equivalents thereof and at least 80 mole % of the low molecular weight diol consisting of 1,4-butanediol or the ester forming equivalents thereof, the sum of the mole percentages of the dicarboxylic acid which is not terephthalic acid or the ester forming equivalents thereof and of the low molecular weight diol which is not 1,4-butanediol of the ester forming equivalents thereof is not higher than 20 and the short-chain ester units form 50–75% by weight of the copolyether ester.

It should be added that in the U.S. Pat. No. 3,023,192 the use is recommended of copolyether ester film of polyethylene terephthalate modified with about 35 to 75% by weight of polyethylene oxide glycol for the manufacture therefrom of shoe-upper leather. For the manufacture of rainwear, however, the polymers mentioned in it have not been found quite suitable in that they are not only less permeable to water vapour, but absorb far more water than desirable for said use.

Suitable textile materials are those that are as a rule employed for the manufacture of rainwear, sleeping bags, tents and the like. Special mention is made here of fabrics based on polyethylene terephthalate and polyamide 6 or 66. The most favourable results are obtained generally when the textile material is rendered hydrophobic. This is preferably done after lamination with the copolyether ester film. When the hydrophobic material is wetted for instance by rain, the water will just run off it in the form of drops.

The degree of water vapour permeability of the copolyether ester film is, of course, not only dependent on the composition of the copolyether ester, but also on the film thickness. At any chosen film thickness the water vapour permeability should always be at least 1000 g/m² day. It has been found that very favourable results are obtained using a polymer film having a thickness in the range of 5 to 35 μm. Optimum results are generally obtained when the thickness of the polymer film is in the range of 10 to 25 μm.

For the preparation of the copolyether esters to be used in the composite products according to the present invention reference is made to British Patent Specifications Nos. 682,866, 1,403,210 and 1,404,340. Preference is given to copolyether esters of which the short-chain units entirely or substantially consist of polybutylene terephthalate units. Films of these copolyether esters are easy to prepare. Moreover, films of this material generally show better physical properties for the present use than films of copolyether esters in which for instance 20% of the terephthalic acid has been replaced with a different dicarboxylic acid. For special uses replacement of a small percentage of the 1,4-butanediol with an other diol and/or replacement of terephthalic acid with an other low molecular weight dicarboxylic acid may be of advantage. Included among low molecular weight diols (other than 1,4-butanediol) which are converted into short-chain ester units are acyclic, alicyclic and aromatic dihydroxy compounds.

Preferred are diols with 2–15 carbon atoms such as ethylene, propylene, isobutylene, pentamethylene, 2,2-dimethyltrimethylene, hexamethylene, and decamethylene glycol, dihydroxy cyclohexane, cyclohexane dimethanol, resorcinol, hydroquinone and 1,5-dihydroxy naphthalene.

Especially preferred are aliphatic diols containing 2–8 carbon atoms. Included among the bis-phenols which can be used are bis(p-hydroxy)diphenyl, bis(p-hydroxyphenyl)methane and bis(p-hydroxyphenyl)propane. Corresponding ester forming derivatives of diols are also suitable for use (for instance epoxy ethane or ethylene carbonate may be used instead of ethylene glycol).

The term "low molecular weight diols" as used in the description of the invention also refers to these corresponding ester forming derivatives, the molecular weight requirement relating to the diol as such and not to derivatives thereof.

Suitable dicarboxylic acids (other than terephthalic acid) which are reacted with the afore-mentioned long-chain glycols and with low-molecular weight diols to form copolyesters are aliphatic, cycloaliphatic or aromatic dicarboxylic acids having a molecular weight not higher than 300. The term dicarboxylic acid used in the description of the invention also refers to equivalents of dicarboxylic acids having two functional carboxyl groups whose behaviour is practically the same as that of the dicarboxylic acids in the conversion with glycols and diols to copolyesters. These equivalents include esters and ester forming derivatives, such as the acid halides and anhydrides. The requirements regarding the molecular weight relate to the acid and not to equivalent esters or ester forming derivatives thereof. The dicarboxylic acids may contain randomly substituted groups or combinations which do not detrimentally affect polyester formation or the use of the polymer in the compositions according to the invention. Aliphatic dicarboxylic acids, as the term is used herein, are carboxylic acids having two carboxyl groups which are each attached to a saturated carbon atom. Aliphatic or cycloaliphatic acids having conjugated unsaturation often cannot be used because of vinylpolymerization. However, some unsaturated acids, such as maleic acid, can be used. Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Preference is given to cyclohexane dicarboxylic acids and adipic acid. Representative aromatic dicarboxylic acids which can be used include phthalic and isophthalic acids, bibenzoic cid, substituted dicarboxy compounds with two benzene nuclei such as bis(p-carboxyphenyl)methane, p-oxy(p-carboxyphenyl) benzoic acid, ethylene-bis(p-oxybenzoic acid) 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid and $C_1$–$C_{12}$ alkyl and ring substitution derivatives thereof, such as halo, alkoxy, and aryl derivatives. Hydroxyl acids such as p($\beta$-hydroxy-ethoxy) benzoic acid can also be used providing an aromatic dicarboxylic acid is also present.

Aromatic dicarboxylic acids are a preferred class for preparing the copolyester polymers of this invention. Among the aromatic acids, those with 8–16 carbon atoms are preferred, particularly the phenylene dicarboxylic acids, i.e., phthalic and isophthalic acids.

The long-chain glycols preferably entirely consist of polyethylene oxide glycol. In some cases it may be desirable to make use of random or block copolymers of epoxyethane and minor amounts of a second epoxy alkane. It is preferred that the second monomer should form less than 40 mole % of the polyalkylene oxide glycols and, more preferably, less than 20 mole %. Examples of suitable second monomers include 1,2- and 1,3-epoxy propane, 1,2-epoxy butane and tetrahydrofuran. Alternatively, use may be made of mixtures of polyethylene oxide glycol and a second polyalkylene oxide glycol, such as poly-1,2-propylene oxide glycol or polytetramethylene oxide glycol.

The polymers described herein can be made conveniently by a conventional ester interchange reaction. A preferred procedure involves heating the dimethyl ester of terephthalic acid with a long chain glycol and a molar excess of 1,4-butanediol in the presence of a catalyst at 150° to 260° C. followed by distilling off methanol formed by the interchange. Heating is continued until methanol evolution is complete. Depending on temperature, catalyst and glycol excess, this reaction is complete within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols, as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long-chain glycol.

The resulting prepolymer is then carried to high molecular weight by distillation of the excess of short chain diol. This process is known as "polycondensation". Additional ester interchange occurs during this distillation to increase the molecular weight and to randomize the arrangement of the copolyester units. Best results are usually obtained if this final distillation or polycondensation is run at a pressure not higher than 130 Pa and 240°–260° C. for less than 2 hours in the presence of antioxidants such as sym- di- beta- naphthyl-p-phenylenediamine and 1,3,5-trimethyl-2,4,6-tri[3,5-ditertiarybutyl-4-hydroxybenzyl]benzene.

Most practical polymerisation techniques rely upon ester interchange to complete the polymerization reaction. In order to avoid excessive hold time at high temperatures with possible irreversible thermal degradation, it is advantagous to employ a catalyst for ester interchange reactions. While a wide variety of catalysts can be used, organic titanates such as tetrabutyl titanate used alone or in combination with magnesium or calcium acetate ar preferred. Complex titanates, such as Mg[HTi(OR$_6$)]$_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The long-chain glycol used according to the invention is always a polyethylene oxide glycol having a molecular weight in the range of 800 to 6000.

When use is made of a polyethylene oxide glycol having a molecular weight <800, the proportion thereof to be incorporated in the copolyether ester is prohibitively high. For, a film made therefrom having a thickness of, say 35 μm and a water vapour permeability of at least 1000 g/m$^2$ day has been found unsuitable for use in waterproof garments or tents because of its physical properties. Also the manufacture of garments from copolyether ester films prepared by using a polyethylene oxide glycol having a molecular weight >6000 leads to unsatisfactory results in that the physical properties of the copolyether ester films are deficient in several respects, e.g. as far as strength is concerned. Generally, the most favourable results are obtained when the long-chain glycol is a polyethylene oxide glycol having a molecular weight in the range of 1000 to 4000. It has been found that the use of a long-chain glycol having a molecular weight in the range of 1000 to 2000 results in obtaining films having very good properties when the percentage short-chain ester units used is in the range of 60 to 75% by weight. When, however, the molecular weight of the long-chain glycol is in the range of 2000 to 4000, then it is preferred to use a copolyether ester of which the proportion of short-chain ester units is in the range of 65 to 75% by weight.

For use in the products of the present invention very good results are obtained with copolyether ester films produced by film blowing or flat die extrusion, said films having a water absorption not higher than 17% by weight, calculated on the weight of the dry films, measured at 23° C. in water in accordance with DIN 53495.

Preferred to that end is the use of polymers which can be transformed by film blowing into films showing a water absorption not higher than 11% by weight.

The manufacture of films from the present copolyether esters is carried out in the manner known per se from the art, as described in Kirk-Othmer, Encyclopedia of Chemical Technology 9 (1966), pp. 232–241.

By the film blowing process films may be obtained having a thickness in the range of 5 to 35 μm.

Preference, however, is given to films obtained by flat-die extrusion on a roll. Preferably, the temperature of the roll is chosen between 40° and 120° C., as described in U.S. Pat. No. 3,968,183.

The films made in the above-described way generally have a lower absorption capacity than the films obtained by, for instance, compression moulding.

The copolyester film may be attached to the porous textile material in various ways, which may include a heat treatment, sewing or the use of an adhesive. Alternatively, the copolyester film may be enclosed by two layers of textile materials, leading to a construction of at least three layers.

The adhesive to be used is not only dependent on the composition of the copolyether ester, but also on the type of substrate. It has been found that generally favourable results are obtained by using a bicomponent glue. The one component of this glue is formed by a prepolymer having —NCO—containing endgroups and the other component by a prepolymer having OH-endgroups. The bicomponent glue is applied to the film and/or the cloth with the aid of a screen roll from a solution, e.g. in ethyl acetate, followed by bonding upon evaporation of the solvent.

In this way a windproof material is obtained having a water vapour permeability of as high as at least 1000, but preferably exceeding 2000 g/m$^2$ day. The invention will be further described in the following examples, which are of course not to be construed as limiting in any manner the scope thereof. All parts and percentages mentioned in this application are by weight, unless otherwise indicated.

The following methods were used for determining the properties of the copolyether ester films and/or the composite products according to the invention.

A. Determination of absorption in water at 23° C. in accordance with DIN 53495.

B. Determination of water vapour permeability at 30° C. and 50% RH in accordance with ASTM E96-66 (Procedure B).

C. Determination of waterproofness with a modified Sutter's test apparatus and by the Mullin's Burst Test, which two tests are described in the afore-mentioned British Patent Specification No. 2,024,100.

In the Sutter test the waterproofness is determined visually. The test procedure includes subjecting the copolyether ester film to a hydrostatic head of 25 cm of water over a period of 20 minutes.

In the Mullin's Burst Test the waterproofness is also determined visually. For 10 seconds a particular pressure is applied, which is subsequently maintained for 30 seconds.

A superatmospheric pressure level of about 213 kPa (2.1 atmospheres gauge pressure) is used as an acceptance level for the use envisaged.

EXAMPLE I

Into a 200-l autoclave there were introduced 33.3 kg of dimethyl terephthalate, 21.6 kg of 1,4-butanediol and 12.5 kg of polymethylene oxide glycol having an average molecular weight of 4000. The reaction mixture was heated to 110° C., with stirring, followed by adding 500 ppm of tetrabutyl titanate, calculated on dimethyl terephthalate. Upon a further increase in temperature to 160° C. methanol distilled off, after which the pressure was slowly reduced to 100 Pa and the temperature increased to 245° C.

This polycondensation reaction, which lasted 3 to 4 hours, led to a product having a relative viscosity of 2.53 (measured on a concentration of 1 g in 100 g of m-cresol at 25° C.).

In the same way as indicated above several copolyether esters were prepared using varying amounts of the above-mentioned polyethylene oxide glycols and polyethylene oxide glycols having molecular weights of 1000 and 2000.

The copolyether esters prepared had the following composition:

|   | Wt. % short-chain ester units | molecular weight polyethylene oxide glycol (PEG) | $\eta_{rel}$ |
|---|---|---|---|
| A | 74,2 | 4000 | 2,53 |
| B | 69,0 | 4000 | 2,76 |
| C | 63,8 | 4000 | 2,86 |
| D | 58,7 | 4000 | 3,04 |
| E | 68,0 | 2000 | 2,61 |
| F | 66 | 1000 | 2,50 |

EXAMPLE II

The copolyether esters prepared in Example I were subjected to postcondensation in the solid state up to a relative viscosity between 3.5 and 4 and transformed by film blowing into films having a thickness ranging from 10 to 30 μm, after which the water absorption of the films was measured in water at 23° C. in accordance with DIN 53495. The results are given in Table 1.

TABLE 1

| Copolyether ester | Water absorption (wt. %) |
|---|---|
| A | 5 |
| B | 11 |
| C | 17 |
| D | 20 |
| E | 8 |
| F | 3 |

The films were subsequently laminated with a polyamide 6 fabric and made into garments (anoraks). The reactions of participants in a wearing test were very favourable.

EXAMPLE III

The copolyether esters prepared in Example I were again postcondensated in the solid state up to a relative viscosity between 3.5 and 4 had been obtained, transformed by film blowing into films having the thicknesses given in the table below. Of these films the water vapour permeability (WVP) was measured at 30° C. and 50% RH in accordance with procedure B of ASTM E96-66.

The results are given in the table below.

TABLE 2

| Copolyether ester | film thickness (in μm) | WVP (g/m² · 24 hr) |
|---|---|---|
| A | 12 | 1700 |
|   | 22 | 1460 |
| B | 12 | 2200 |
|   | 19 | 2040 |
| C | 18 | 2340 |
|   | 30 | 2000 |
| D | 15 | 2440 |
|   | 28 | 1950 |
| E | 17 | 1800 |
|   | 25 | 1400 |
| F | 11 | 2080 |
|   | 26 | 1230 |

The above table clearly shows that with the percentage of short-chain ester units remaining the same, the WVP increases with increasing molecular weight of the polyethylene oxide glycol.

EXAMPLE IV

Of the films prepared in Example III the water proofness was measured in the same way as indicated before at a pressure in the range of 5 to 400 kPa.

Visually assessed, none of the films A through F tested were found to be permeable to water.

EXAMPLE V

The polymers B, C and D of Example I having butylene terephthalate units (BTP) as short-chain ester units were compression moulded into films, after which the water vapour permeability (WVP) and the water absorption were determined in the before-indicated manner.

The properties of these films were compared with those of similarly prepared films with ethylene terephthalate units (ETP) as short-chain ester units.

The molecular weight of the polyethylene oxide glycols used in all the polymers was 4000.

The results of the measurements are given in the table below.

TABLE 3

| Polymer | wt. % BTP, and ETP | $\eta_{rel}$ | film thickness (μm) | WVP (g/m² 24 hr) | water absorption (wt. %) |
|---|---|---|---|---|---|
| B | 69,0 BTP | 2,76 | 80 | 1060 | 16 |
| P | 63,8 ETP | 2,00 | 60 | 1280 | 29 |
| C | 63,8 BTP | 2,86 | 73 | 1470 | 21 |
| Q | 58,7 ETP | 2,26 | 68 | 1240 | 35 |
| D | 58,7 BTP | 3,04 | 69 | 1620 | 28 |
| R | 48,4 ETP | 2,18 | — | — | 54 |

The results in the table above show that the water absorption of the polymer films P and Q, of which the short-chain ester units are ethylene terephthalate units, is considerably higher than that of the polymer films C and D of similar compositions, but with butylene terephthalate units as short-chain ester units.

Surprisingly, the water vapour permeability of the films P and Q is considerably lower than that of the similar polymers C and D. From a comparison with Table 1 it also appears that the water absorption of compression moulded films is far higher than that of films obtained by the film blowing process.

EXAMPLE VI

A series of films were flat-die extruded from copolyether esters having butylene terephthalate units (BTP) or ethylene terephthalate units (ETP) as short-chain ester units and polyethylene oxide glycol (PEG) having a molecular weight of 4000 as polyether. One copolyether ester moreover contained polytetramethylene oxide (PTMG) having a molecular weight of 1000.

Of the films thus obtained the water vapour permeability and the water absorption were determined in the above-indicated way.

The measuring results are listed in the table below.

TABLE 4

| Polymer | wt. % BTP or ETP | polyether | film thickness (μm) | WVP (g/m² 24 hrs) | water absorption (wt. %) |
|---|---|---|---|---|---|
| K | 57,7 BTP | 75 wt. % PEG 25 wt. % PTMG | 19,3 | 1830 | 19 |
| L | 63,8 ETP | 100% PEG | 11,1 | 1780 | 25 |

TABLE 4-continued

| Polymer | wt. % BTP or ETP | polyether | film thickness (μm) | WVP (g/m² 24 hrs) | water absorption (wt. %) |
|---|---|---|---|---|---|
| M | BTP | 100% PEG | 19,5 | 1630 | 14 |
| N | ETP | 100% PEG | 19,8 | 1280 | 21 |

The above table clearly shows that at a similar thickness films obtained from copolyether esters with ethylene terephthalate units as short-chain ester units invariably display a higher water absorption and a lower water vapour permeability than films made from copolyether esters with butylene terephthalate units as short-chain ester units. The above table also shows that partial replacement (up to 30% by weight) of the PEG 4000 with a polyalkylene oxide glycol having a higher atomic carbon to oxygen ratio than 2.4, such as PTMG, leads to a film having a very good water vapour permeability, but a somewhat higher water absorption than that of a film from a copolyether ester containing a similar weight percentage of PEG but no PTMG (polymer M).

We claim:

1. Flexible layered product for use in waterproof garments or tents of a textile material covered with a waterproof material having a water vapour transmission rate of at least 1000 g/m² day, characterized in that the textile material is covered with a film of a copolyether ester consisting of a plurality of recurrent intralinear long-chain ester units and short-chain ester units which are randomly joined head-to-tail through ester bonds, said long-chain ester units corresponding to the formula:

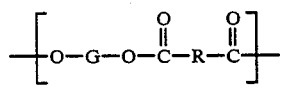

said short-chain ester units corresponding to the formula:

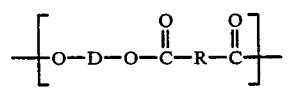

where G is a divalent radical remaining after removal of terminal hydroxyl groups from at least one long-chain glycol having a molecular weight in the range of 800 to 6000 and an atomic ratio of carbon to oxygen in the range of 2.0 to 4.3, at least 70% by weight of the long-chain glycol having a carbon to oxygen ratio in the range of 2.0 to 2.4, R is a divalent radical remaining after removal of carboxyl groups from at least one carboxylic acid having a molecular weight less than 300, and D is a divalent radical remaining after removal of hydroxyl groups from at least one diol having a molecular weight less than 250, at least 80 mole % of the dicarboxylic acid used consisting of terephthalic acid or the ester forming equivalents thereof and at least 80 mole % of the low molecular weight diol consisting of 1,4-butanediol or the ester forming equivalents thereof, the sum of the mole percentages of the dicarboxylic acid which is not terephthalic acid or the ester forming equivalents thereof and of the low molecular weight diol which is not 1,4-butanediol or the ester forming equivalents thereof is not higher than 20 and the short-chain ester units form 50–75% by weight of the copolyether ester.

2. A product according to claim 1, characterized in that the textile material is hydrophobic.

3. A product according to claim 1, characterized in that the thickness of the polymer film is in the range of 5 to 35 μm, preferably 10 to 25 μm.

4. A product according to claim 1, characterized in that the short-chain ester units of the copolyether ester substantially consist of polybutylene terephthalate units.

5. A product according to claim 1, characterized in that the copolyether ester contains a long-chain glycol consisting of polyethylene oxide glycol having a molecular weight in the range of 1000 to 4000.

6. A product according to claim 1, characterized in that at a molecular weight of the long-chain glycol between 1000 and 2000 the proportion of the short-chain ester units in the copolyether ester is in the range of 60 to 75% by weight.

7. A product according to claims 1, characterized in that at a molecular weight of the long-chain glycol between 2000 and 4000 the proportion of the short-chain ester units in the copolyether ester is in the range of 65 to 75% by weight.

8. A product according to claim 1, characterized in that use is made of copolyether ester films produced by film blowing or flat die extrusion, said films having a water absorption not higher than 17% by weight, calculated on the weight of the dry films, measured at 23° C. in water in accordance with DIN 53495.

9. A product according to claim 8, characterized in that the water absorption is not higher than 11% by weight.

REEXAMINATION CERTIFICATE (3349th)
United States Patent [19]
Vrouenraets et al.

[11] B1 4,493,870
[45] Certificate Issued Oct. 14, 1997

[1] FLEXIBLE LAYERED PRODUCT

[5] Inventors: Cornelius M. F. Vrouenraets, Dieren; Doetze J. Sikkema, Ellecom, both of Netherlands

[3] Assignee: Akzo N.V., Arnhem, Netherlands

Reexamination Request:
No. 90/004,328, Aug. 9, 1996

Reexamination Certificate for:
Patent No.: 4,493,870
Issued: Jan. 15, 1985
Appl. No.: 556,999
Filed: Dec. 1, 1983

[0] Foreign Application Priority Data

Dec. 2, 1982 [NL] Netherlands .......................... 8204675

[51] Int. Cl.$^6$ .................................................... B32B 27/00

[52] U.S. Cl. .................... 442/236; 428/419; 428/475.2; 428/913; 442/286; 442/287

[58] Field of Search ................................ 428/245, 246, 428/252, 419, 913, 475.2; 442/236, 286, 287

[56] References Cited
FOREIGN PATENT DOCUMENTS 51-111290   10/1976   Japan.

*Primary Examiner*—James J. Bell

[57] ABSTRACT

Flexible layered product for use in waterproof garments or tents of a textile material covered with a waterproof material having a water vapor transmission rate of at least 1000 g/m$^2$ day, the textile material being covered with a film of a copolyether ester consisting of a plurality of recurrent intra-linear long-chain ester units and short-chain ester units which are randomly joined head-to-tail through ester bonds.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 3 are determined to be patentable as amended.

Claims 2 and 4–9, dependent on an amended claim, are determined to be patentable.

New claim 10 is added and determined to be patentable.

1. Flexible layered product [for use] in *the form of* waterproof *rainwear* garments or tents of a textile material covered with a waterproof material having a water [vapour] *vapor* transmission rate of at least 1000 g/m² day, characterized in that the textile material is covered with a film of copolyether ester consisting of a plurality of recurrent multilinear long-chain ester units and short-chain ester units which are randomly joined head-to-tail through ester bonds, said long-chain ester units corresponding to the formula:

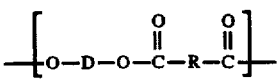

said short-chain ester units corresponding to the formula:

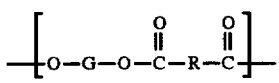

where G is a divalent radical remaining after removal of terminal hydroxyl groups from at least one long-chain glycol having a molecular weight in the range of 800 to 6000 and an atomic ratio of carbon to oxygen in the range of 2.0 to 4.3, at least 70% by weight of the long-chain glycol having a carbon to oxygen ratio in the range of 2.0 to 2.4, R is a divalent radical remaining after removal of carboxyl groups from at least one [carboxylic] *dicarboxylic* acid having a molecular weight less than 300, and D is a divalent radical remaining after removal of hydroxyl groups from at least one diol having a molecular weight less than 250, at least 80 mole % of the dicarboxylic acid used consisting of terephthalic acid or the ester forming equivalents thereof and at least 80 mole % of the low molecular weight diol consisting of 1,4-butanediol or the ester forming equivalents thereof, the sum of the mole percentages of the dicarboxylic acid which is not terephthalic acid or the ester forming equivalents thereof and of the low molecular weight diol which is not 1,4-butanediol or the ester forming equivalents thereof is not higher than 20 and the short-chain ester units form 50–75% by weight of the copolyether ester.

3. A product according to claim 1, characterized in that the thickness of the polymer film is in the range of 5 to 35 μm[, preferably 10 to 25 μm].

*10. A product according to claim 3, wherein the thickness of the polymer film is in the range of 10 to 25 μm.*

\* \* \* \* \*